United States Patent
Watanabe et al.

[15] 3,678,982
[45] July 25, 1972

[54] PNEUMATIC RADIAL TIRE

[72] Inventors: Shigeo Watanabe; Toshiyuki Sogi; Tsuneo Mukai, all of Tokyo, Japan

[73] Assignee: Bridgestone Tire Company Limited, Tokyo, Japan

[22] Filed: Aug. 22, 1969

[21] Appl. No.: 852,377

[30] Foreign Application Priority Data

Aug. 27, 1968 Japan..................................43/60865

[52] U.S. Cl............................................................152/361
[51] Int. Cl..........................................................B60c 9/20
[58] Field of Search...................................................152/361

[56] References Cited

UNITED STATES PATENTS

| | | | |
|---|---|---|---|
| 2,493,614 | 1/1950 | Bourdon | 152/361 |
| 3,095,027 | 6/1963 | Weber | 152/355 |
| 3,315,722 | 4/1967 | Marzocchi et al. | 152/359 |
| 3,386,487 | 6/1968 | Massoubre | 152/361 |

FOREIGN PATENTS OR APPLICATIONS

| | | | |
|---|---|---|---|
| 1,111,806 | 3/1956 | France | 152/361 |
| 726,810 | 3/1955 | Great Britain | 152/361 |
| 406,862 | 8/1966 | Switzerland | 152/36 |

*Primary Examiner*—Arthur L. La Point
*Assistant Examiner*—Robert Saifer

[57] ABSTRACT

A pneumatic radial tire for use in large vehicles having a carcass ply consisting of layers of rubber coated cords extending in radial directions of the tire between beads on both sides, and a reinforcing breaker in a crown encircling the carcass ply in circumferential directions. At least one organic, natural or synthetic cord layer wider than adjacent metal cord layers is arranged between the metal cord layers forming a breaker.

5 Claims, 6 Drawing Figures

Patented July 25, 1972  3,678,982

INVENTORS
SHIGEO WATANABE
TOSHIYUKI SOGI
TSUNEO MUKAI
BY *Fleit, Gipple & Jacobson*
ATTORNEYS

PNEUMATIC RADIAL TIRE

The present invention relates to an improvement in tires for use in large vehicles such as trucks and buses, particularly in radial tires having metal core breakers.

A tire of this type hitherto used comprises a carcass ply consisting of layers of rubber coated cords extending in radial directions of the tire between both beads, and a reinforcing breaker consisting of a layer or superposed layers encircling the crown portion of said carcass ply in circumferential direction of the tire, and said breaker being made of rubber coated metal cords having high strength and a high rigity in order to obtain enough strength for maintaining the inner pressure of the tire and to obtain a belting effect peculiar to a radial tire.

A radial tire having such a construction performs substantially the same as an ordinary radial tire, but has a disadvantage in that its wear-resistance and durability are poor. Good wear-resistance and high durability are particularly necessary in tires used in large vehicles such as trucks, buses and the like.

Namely, in order to improve the wear-resistance of a tire, it is peferable to increase the crown rigidity of a tire in circumferential directions, for which purpose, the angles of metal cords forming a breaker to the circumferential direction of the tire must be as small as possible. However, the more the angles of the cords are small, the more the separations between layers of the breaker are liable to be caused, which in turn tends to decrease the durability of the tire.

The tire of this type has a second disadvantage in that it is difficult to prevent irregular wear of the tire without decreasing the durability, which is important for tires for use in large vehicles such as trucks, buses and the like.

The term "irregular wear" used herein is intended to designate what is called "shoulders wear" meaning that the shoulder portions of the tire tread extremely rapidly wear off as compared with the other parts of the tire tread. This is caused by the rapid decrement of the crown rigidity in the absence of the breaker layers in the proximity of the ends of the crown in addition to the decrement of the rigidity of the crown from its center to its ends.

This irregular wear remarkably occurs in tires for use in large vehicles such as trucks and buses. Irregular wear causes an extreme shortening of the life of a tire. Moreover, irregular wear also causes unstable running in a vehicle equipped with these tires which results in an interference with the safety of the vehicle when travelling.

In order to diminish the irregular wear, that is, "shoulders wear", the width of a breaker can be widened as much as possible. However, the increase in the width of the breaker causes separations at the ends of the breaker so that the durability of the tire is decreased.

The tire of this type further has a third disadvantage of uncomfortable ride characteristics due to its less shock absorbing faculty against small shocks resulting from small unevenness in a road because its breaker consists of metal cords.

Moreover, the tire of this type has a fourth disadvantage in that when moisture entering through crack or cut in tread rubber reaches to breaker layers, the upper layer will become rusty owing to the less corrosion resistance of metal cords to moisture resulting in separations between the breaker layer and the tread rubber or between upper and lower layers of the breaker.

This separation phenomenon tends to frequently occur at the end of the period of the tire life. Such separations will be referred to as "separations due to cuts" hereinafter.

The tire of this type has furthermore a fifth disadvantage in that it is difficult to recap the tire. In particular, it is difficult to carry out the tread rubber buffing operation, which is one step in the recapping process.

When the tread rubber of a tire has substantially worn off without any failure at other portions, it is customary to use the tread-worn tire as a retreaded tire after the so called "recap" or "retread" process. A tire recap manufacturer, who treats a large number of tires worn off into various shapes, first cuts out the worn tread crown surfaces of a tire to form a predetermined shape by means of a buffing machine.

In this buffing process, great care is needed because of the metal cords of a breaker, each of which comprises a cord body of a number of filaments twisted with each other and a filament encircling spirally the cord body. If a worn tread crown is removed by buffing to the spiral filament, sections of the finely cut filaments extend from the buffed tire surface. This in turn makes it difficult or almost impossible in some cases to attach a new tread rubber by vulcanization the subsequent retread process.

Even if the adhesion by vulcanization were established, when the recapped tire is used for a vehicle, the metal cords become fatigued concentrically at the local portion of the finely cut filaments so that the composition of cords is disturbed resulting in breakdown of the breaker cords.

It is an object of the present invention to provide radial tires for use in large vehicles which are superior in durability and wear-resistance and which further provides a comfortable ride as well as being capable of diminishing irregular wear.

For that purpose, the radial tire according to the present invention for use in large vehicles which has a carcass plycord extending from one of the beads via a crown to the other of the beads whose ends are turned up about the beads on both sides is characterized in that natural or synthetic organic fiber cord layers wider than adjacent metal cord layers are arranged between the metal cord layers forming the breaker.

For a better understanding of the invention, reference is made to the accompanying drawings in which:

FIG. 4 is a diametrical sectional view of a tire showing further embodiment according to the invention.

Figure 1:
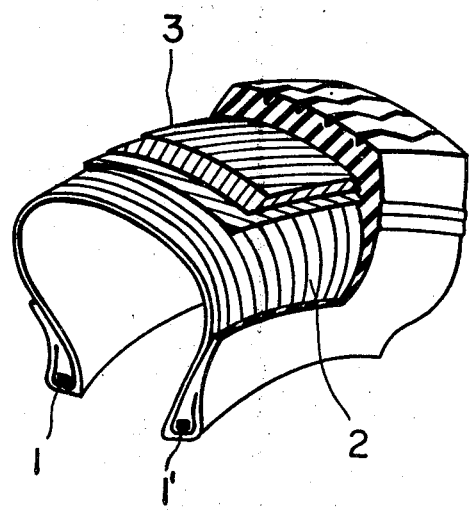
FIG. 1 is a perspective view of a part of a conventional pneumatic radial tire exposing its carcass and breaker.

Referring to FIG. 1, a hitherto used radial tire comprises carcass ply 2 consisting of layers of rubber coated cords extending in radial directions of the tire between beads 1 and 1' on both sides and a reinforcing breaker 3 in a crown encircling the carcass ply 2 in a circumferential direction of the tire.

Figure 2:
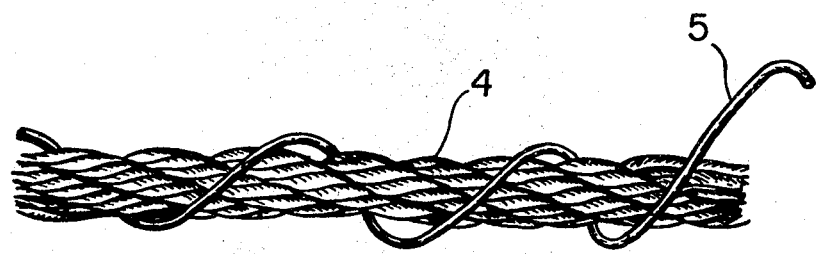
FIG. 2 is a perspective view of a part of a metal cord of the breaker.

Referring to FIG. 2 showing a metal cord of a breaker, the cord comprises a cord body 4 of a number of filaments twisted with each other and a filament 5 encircling spirally the cord body 4.

As used in this specification, the word "filament" or "fiber" refers to an individual fiber or solid rod. A "strand" on the other hand, refers to a collection of a great plurality of individual filaments, and a "cord" refers to a plurality of strands. Moreover, in referring to tire cords, the terms "denier" and "twist," as is well known in the art, are used. For example, a nylon cord of 840 denier/2 twists consists of two twisted strands, each strand also consisting of 140 filaments of 6-denier nylon; and a nylon cord of 1,260 deniers/3 twists consists of three twisted strands, each strand also consisting of 210 filaments of 6-denier nylon.

Figure 3:
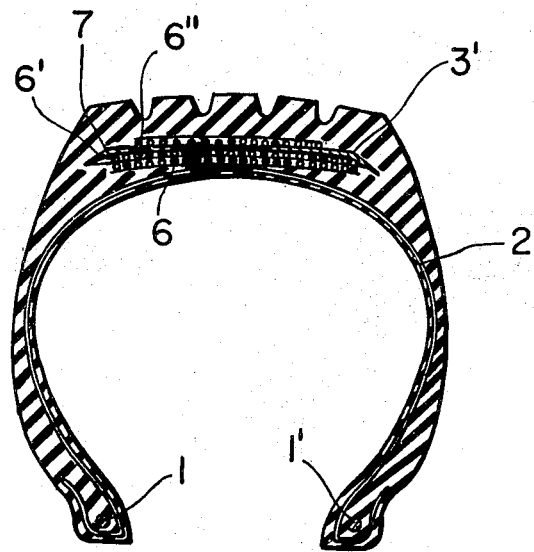
FIGS. 3, 4 and 5 are diametrical sectional views of tires showing one embodiment according to the invention.

Referring to FIG. 3 showing a first embodiment of the invention, a tire shown in a diametrical cross section comprises beads 1 and 1' on both sides, a carcass ply 2 consisting of cords coated with rubber radially extending parallel to each other between the beads, and breakers 3' as reinforcing layers arranged in the crown of the tire and encircling the periphery of the carcass ply 2 in circumferential directions of the tire.

The breaker 3' consists of rubber coated cord layers 6, 6', 6'' and 7, the layers 6, 6' and 6'' being metal cord layers and the layer 7 being organic textile cord layers in this embodiment.

The material of cords of the the layer 7 is natural or synthetic organic fiber having a modulus of elasticity lower than those of metals. The width of the layer 7, as viewed in a diametrical cross section is sufficient so that the layer 7 extends beyond the edges of the metal cord layers 6 and 6''.

The angle of cords of the rubber coated metal cord layer 6 to the circumferential direction is an angle of between 45° and 85° to form a triangular mesh construction in combination with the cords of the metal cord layers 6' and 6'' for the purpose of increasing the rigidity of the breaker.

In order to provide the "belting effect" of a radial tire, that is, the circumferential reinforcement, good maneuverability, wear-resistance, etc., the, the metal cords constituting the rubber coated metal cord layers 6' and 6'' are arranged at angles of less than 30° to the circumferential direction of the tire, and the metal cords of the rubber coated metal cord layers 6' and 6'' are crossed to each other with respect to the circumferential directions of the tire in order to obtain a good balance of the tire.

In a radial tire of this type, breaker separations would often occur between the metal cord layers 6' and 6''. However, the insertion of the rubber coated organic textile cord layer 7 between the metal cord layers 6' and 6'' according to the invention serves to eliminate shearing action between the inextensible metal cord layers so that the separations can be completely prevented.

As above described, in order to avoid irregular wear, that is, shoulders wear, the breaker can be widened as much as possible. However, as breaker width increases, separations at the ends of the breaker are more likely to occur. so that there is a tendency for the durability of the tire to be decreased. On the contrary, in the tire according to the invention, taking consideration of the fact that the less rigid material of a breaker is the less adverse the effect of the increment of the width of the breaker layer on the durability of a tire, only the rubber coated fiber cord layer 7 is widened beyond the edges of the rubber coated metal cord layers 6' and 6''. Such a construction of a tire can minimize its irregular wear without diminishing its durability.

Furthermore, the fact that the rubber coated fiber cord layer 7 is wider than the rubber coated metal cord layers 6' and 6'' avoids the separations between the metal cord layers.

The embodiment of the invention described above, including an interposed rubber-coated fiber cord layer 7 provides a tire more comfortable to ride on in comparison with a tire having only metal cord layers, owing to the improvements of its shock-absorbing faculty against small impacts resulting from small unevennesses on a road.

The tire according to the invention continues to remarkably exhibit these effects even when its tread rubber has been worn off to a thin tread.

Figure 4:
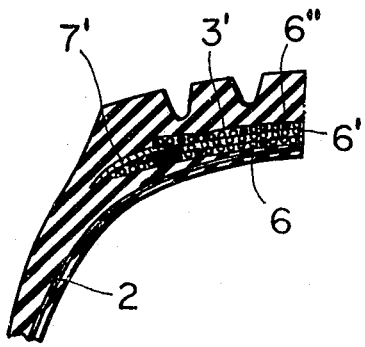
Figure 5:
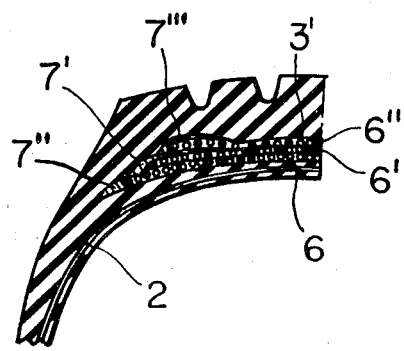

Other embodiments of the invention are shown in FIGS. 4 and 5. Referring to FIG. 4, a breaker 3' arranged on the outside of a carcass ply 2 consists of rubber-coated metal cord layers 6, 6' and 6'' and a rubber-coated fiber cord layer 7'. The metal cord layers are constituted in the same manner as that shown in FIG. 3. Between the metal cord layers 6' and 6'' crossing with each other is arranged the rubber-coated fiber cord layer 7' so as to extend from the ends of the metal cord layers as shown in FIG. 4. The rubber-coated fiber cord layer 7' has a form shaped by removing the center portion of the rubber-coated fiber cord layer 7 described above and leaving the ends of the fiber cord layer alone, the effects of which are the same as those of the fiber cord layer 7 in FIG. 3, because almost all of the separations between cord layers will occur at the both ends of a breaker.

Moreover, the tire shown in FIG. 4 costs less because it can bring about nearly the same effects using less material.

The tire of this embodiment can of course reduce extraordinary wear by increasing the rigidity of the ends of the crown, which is the same effect as in the previously described embodiment. However, the specified construction shown in FIG. 4 does not contribute a great deal to the improvement in the comfort of the ride provided by the tire.

In the specification, the expression "a fiber cord layer wider than adjacent metal cord layers" is intended to include a fiber cord layer as shown at 7' in FIG. 4 in addition to the layer 7 as shown in FIG. 3.

Referring to FIG. 5 showing a further improved embodiment, rubber-coated fiber cord layers 7'' and 7''' are arranged between and out of the ends of metal cord layers 6, 6' and 6'', the cords of which cross with each other. The remaining parts of the tire shown in FIG. 5 are the same as those shown in FIG. 4. The tire shown in FIG. 5 can more effectively avoid separations between layers.

As can be seen from the above description, by inserting a fiber cord layer or layers wider than adjacent metal cord layers and between themetal cord layers constituting a breaker, the invention provides tires for use in the large vehicles which are superior in durability and wear-resistance. Moreover, the tires of this invention provide a comfortable ride and furthermore are capable of eliminating extraordinary wear.

Figure 6:
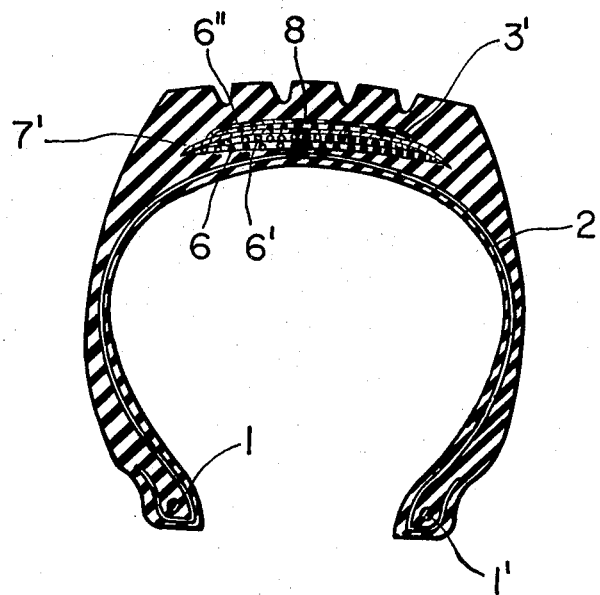

A further improved embodiment according to the invention is shown in FIG. 6.

The object of the embodiment shown in FIG. 6 is to provide a tire capable of effectively avoiding separations due to cuts, which tire at the same time facilitates tire-recapping processes as well as fulfills the objects of the invention described above.

The tire in FIG. 6 is a radial tire for use in large vehicles in which a carcass extends from one of the beads via a crown to the other of the beads and is turned up at its ends about the beads on both sides. Natural or synthetic organic textile cord layers wider than adjacent metal cord layers are inserted between the metal cord layers forming a breaker, and a further organic textile cord layer is arranged on the outside of the breaker.

Referring to FIG. 6, the tire comprises beads 1 and 1' on both sides, a carcass ply 2 consisting of rubber coated cords radially extending parallel to each other between the beads, breakers 3' as reinforcing layers arranged in the crown of the tire and encircling said carcass ply 2 in circumferential directions of the tire.

The breaker 3' consists of rubber coated metal cord layers 6, 6' and 6'' and rubber coated organic textile cord layers 7' and 8 which are made of natural or synthetic organic fiber having a modulus of elasticity lower than those of metals. The layers 7' and 8 are also wider than the metal cord plies 6' and 6''.

The cords of the metal cord layer 6 are at an angle of 45°–85° to the circumferential direction of the tire and the cords of the metal cord layers 6' and 6'' are at an angle of less than 30° to the circumferential direction of the tire. Furthermore, these cords cross to each other in the same manner as shown in the embodiments of FIGS. 3 to 5. The tire of this embodiment can also bring about the same advantages as in the embodiments previously described, that is, superior durability and wear-resistance as well as the capability of providing a comfortable ride and diminished irregular wear. Furthermore, the use of the rubber coated cord layer 8 made of natural or synthetic organic textile cords having a modulus of elasticity lower than those of metals on the outside of the breaker provides a tire exhibiting reduced separations due to cuts.

In a tire having a metal cord layer at the outermost of a breaker, if moisture entering through a crack or cut in tread rubber reaches the breaker layer, the metal cords will become rusty because of their lower corrosion resistance to moisture, so that separations between the breaker layer and tread rubber or the upper and lower breaker layers may possibly occur. Particularly, when tread rubber has become thin, even a small cut will instantly reach the breaker layer and rapidly grow due to fatigue of the rubber, so that separations due to cuts readily occur.

In direct contrast therewith, the tire of this invention as shown in FIG. 6, being provided with a cord layer of natural or synthetic material, such as nylon, rayon, polyester, cotton, hemp, etc., exhibits diminished separations due to cuts, thereby eliminating the above disadvantage.

In the case where a metal cord layer is the outermost layer of a breaker, it is difficult to recap the tire as previously described. In contradistinction thereto, since the tire according to this invention has a fiber cord layer as the outermost layer of the breaker, buffing operations can be carried out without any anxiety. If the organic textile cord layer were damaged in the buffing operation, the durability of the recapped tire would not be affected, because the strength of the breaker depends mainly on the metal cord layers.

As can be seen from the above description, in the embodiment of FIG. 6, since the outermost layer of the breaker of the tire is an organic textile cord layer, the tire in FIG. 6 exhibits diminished separations due to cuts and further allows recapping of the tire when worn. In addition, use of an organic textile cord layer as the outermost layer of the breaker produces a tire capable of providing a comfortable ride and having at the same time superior durability and improved wear-resistance.

What is claimed is:

1. A pneumatic tire having
   a. a carcass composed of at least one body ply of substantially radially oriented cords,
   b. a tread exterior to said carcass, and
   c. a breaker interposed between said carcass and said tread,
   said breaker being composed of at least outer and inner layers of rubberized metal cords and a median layer of rubberized organic textile cords extending continuously over the length of said layer,
   said organic textile cords comprising a plurality of strands of a collection of a great plurality of individual organic fibers,
   said median layer being sandwiched between said outer and inner metal cord layers,
   said median layer extending substantially within the extend of said tread, and
   said median layer being wider than the adjacent metal cord layers.

2. A pneumatic tire cord according to claim 1, wherein a layer of rubberized organic textile cords is located on the outermost side of the outer layer of rubberized metal cords.

3. A pneumatic tire according to claim 1, wherein said organic textile cord layer is selected from the group consisting of nylon, rayon, polyester, vinylon, cotton and hemp.

4. A pneumatic tire having
   a. a carcass composed of at least one body ply of substantially radially oriented cords,
   b. a tread exterior to said carcass,
   c. a breaker interposed between said carcass and said tread,
   said breaker being composed of at least three metal cord layers,
   the innermost metal cord layer having cords arranged at an angle of 45°–85° to the circumferential direction of the tire,
   the remaining metal cord layers having cords arranged at an angle less than 30° and crossing to each other, and
   d. at least one organic textile cord layer interposed between said remaining metal cord layers having cords arranged at an angle less than 30° to the circumferential direction of the tire.

5. A pneumatic tire according to claim 4, wherein said organic textile cord layer is selected from the group consisting of nylon, rayon, polyester, vinylon, cotton and hemp.

* * * * *